Dec. 20, 1927.

T. W. HAWLEY 1,653,564

TRUCK CENTER BEARING

Filed June 8, 1925     2 Sheets-Sheet 1

Inventor

Thomas W. Hawley,

By B. P. Hhburn

Attorney

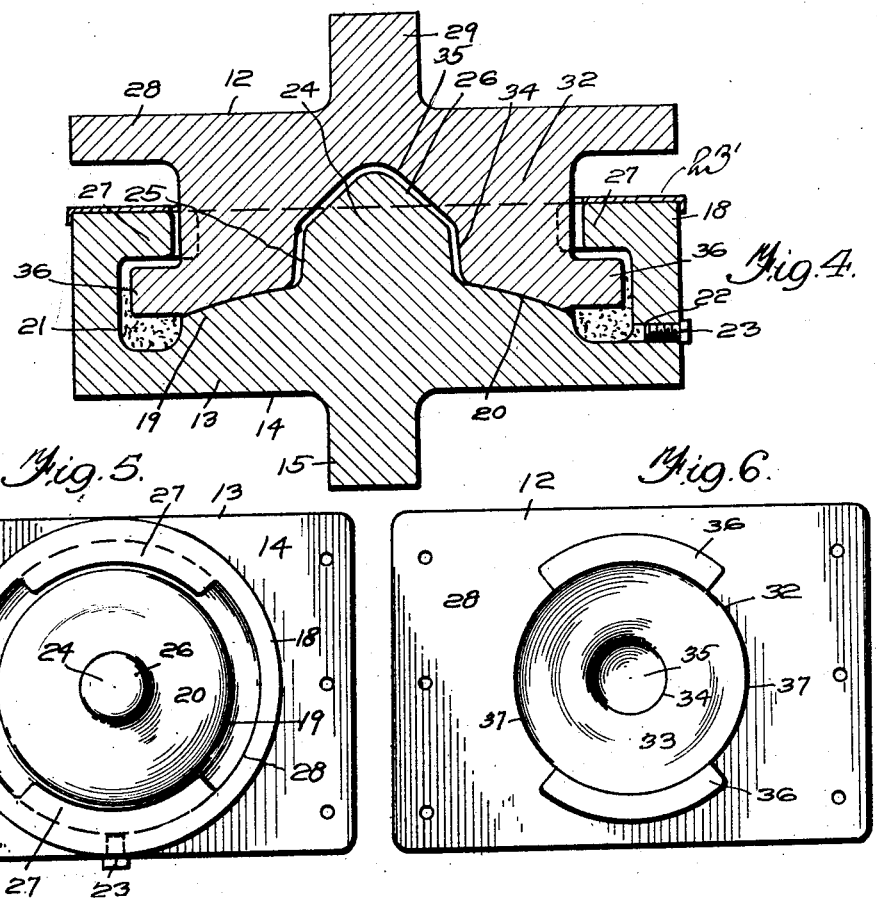

Patented Dec. 20, 1927.

1,653,564

UNITED STATES PATENT OFFICE.

THOMAS W. HAWLEY, OF SAVANNAH, GEORGIA, ASSIGNOR OF ONE-HALF TO HEZEKIAH DENT, OF SAVANNAH, GEORGIA.

TRUCK CENTER BEARING.

Application filed June 8, 1925. Serial No. 35,679.

My invention relates to center plates or bearings, for trucks or railway cars, locomotives, tenders, or the like.

An important object of the invention is to provide a center bearing of the above mentioned character, which is strong, durable, may be maintained properly lubricated, and which will permit of the proper rocking action between the body of the vehicle and truck.

A further object of the invention is to provide a center bearing, formed of two major parts, which are interlocked, in a manner to prevent their improper separation, and which may be secured to the bolsters of the truck and vehicle, in a secure manner.

A further object of the invention is to provide a center bearing, which will eliminate the usual pin extending through the bearing members, and separate therefrom, which pin frequently breaks and may drop out.

A further object of the invention is to provide a center bearing of the above mentioned character, having its parts so arranged that the relative swaying action between the body of the vehicle and truck may freely occur, and provide the maximum engaging surfaces, to prevent excessive swaying action.

Other objects and advantages of the invention will be apparent during the course of the following description.

In the accompanying drawings forming a part of this specification, and in which like numerals are employed to designate like parts throughout the same, Figure 1 is a side elevation of a center truck bearing embodying my invention, Figure 2 is a plan view of the same.

Figure 4 is a transverse section taken on line 4—4 of Figure 2,

Figure 5 is a plan view of the bottom bearing member,

Figure 6 is a bottom plan view of the top bearing member.

Figure 1:
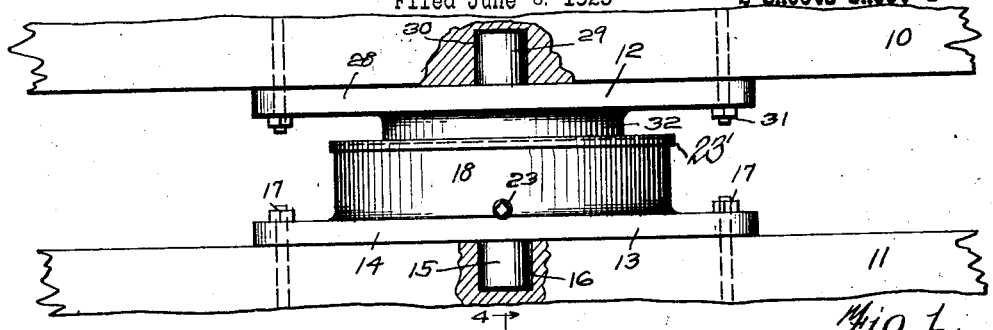

In the drawings wherein for the purpose of illustration is shown a preferred embodiment of my invention, the numeral 10 designates the upper bolster, carried by the body of the vehicle, such as a railway car, locomotive, tender, or the like. The numeral 11 designates the lower bolster carried by the truck.

The center bearing, in the preferred embodiment of the invention, is formed of but two bearing members 12 and 13, which are preferably iron castings, although any other suitable material may be employed. The lower bearing member or casting 13 embodies a preferably flat base 14, having a pin-element 15, integral therewith, at its center, and depending therefrom. This pin element 15 is adapted for insertion within a recess 16, formed through the upper surface of the lower bolster 11, and serves to prevent the shearing action of the lower bearing member, upon its attaching bolts 17, which pass through openings in the base 14 and in the bolster 11, as shown. The lower bearing member or casting further embodies an upstanding preferably cylindrical casing or flange 18, which surrounds in spaced concentric relation a bearing element 19, having an upper spherically curved contact face 20. The bearing element 19 projects above the base 14, providing an annular groove 21, for receiving oil, grease, or other lubricant. It is preferred to provide a drain opening 22, leading to this groove 21, which is closed by a bolt 23. Projecting from the center of the spherically curved face 20 is a pivot pin-element 24, having a lower portion 25, which tapers slightly upwardly and an upper portion 26, which tapers upwardly sharply, as shown. The casing or flange 18 is provided at diametrically opposite points with inwardly projecting retaining jaws or flanges 27, forming segmental openings 28, therebetween. These retaining jaws or flanges are preferably substantially one-fourth of the circumference of the casing 18. All parts of the lower bearing element are preferably formed integral, to afford the maximum strength, and to reduce the cost of production. A two part guard 23′ is preferably placed upon the flange 18.

The upper bearing member 12 embodies a preferably flat attaching plate or cap 28, having a pin-element 29 projecting upwardly from its center, and cast integral therewith. The pin-element 29 is adapted for insertion within a recess 30, formed in the bolster 20, and prevents the shearing action upon the bolts 31, which serve to secure the attaching plate 28 to the upper bolster 10.

Figure 2:
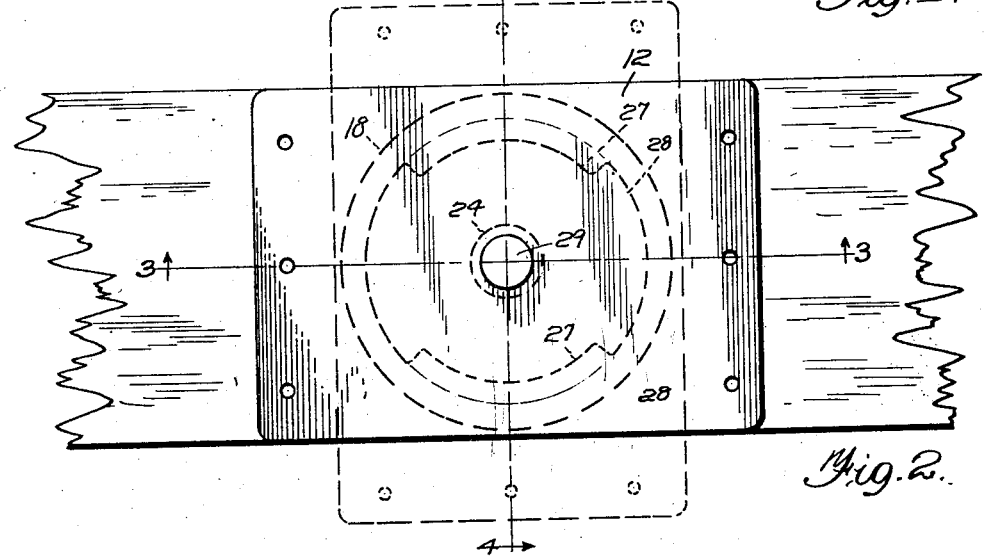
Figure 3:
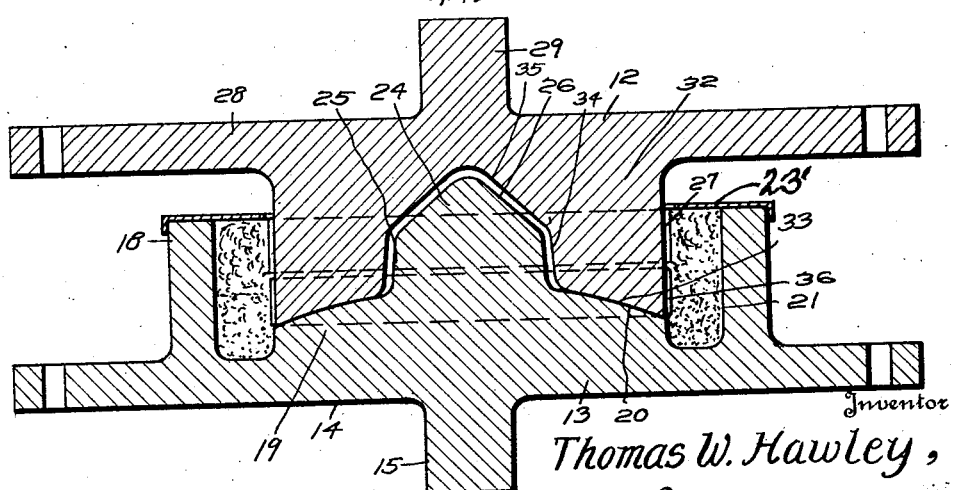
Figure 3 is a longitudinal section taken on line 3—3 of Figure 2.

The upper bearing member 12 embodies a cylindrical bearing element 32, adapted for insertion within the casing or housing 18. The bearing element 32 is provided with a lower concave spherically curved contact face 33, engaging the spherically curved convex contact face 20. The bearing element 32 is provided centrally thereof with a recess, including a slightly upwardly tapered lower portion 34 and a sharply tapered upper 35, rotatably receiving the pivot pin-element 24, as shown. The bearing element 32, see more particularly Figure 6, is provided with outwardly projecting retaining flanges or jaws 36, forming recesses 37, therebetween. The retaining flanges 27 and 37 are adapted to pass each other, when the upper bearing member is placed at substantially a right angle to the lower bearing member, as indicated in Figure 2, subsequently to which the upper bearing member is turned to a position substantially parallel with the lower bearing member, at which time the retaining flanges 36 will engage beneath the retaining flanges 27, as clearly indicated in Figure 4.

Particular attention is called to the fact that there is ample clearance space provided between the tapered faces of the pin-element 24 and the faces of the recess 35, and between the vertical edges of the flanges 27 and 36 and the adjacent vertical walls of the bearing members 12 and 13, and also sufficient clearance space between the adjacent horizontal faces of the flanges 27 and 36, whereby the upper bearing member may roll or rock upon the lower bearing member, within limits, without any of these coacting faces being brought into contact. When the lateral or rocking movement of the upper bearing element is excessive, then the maximum contact surfaces are provided to check the same, since the vertical walls of the flanges 27 and 36 will engage with the adjacent vertical walls of the bearing members 12 and 13, and the faces of the pivot pin-element 24 will engage with the adjacent face of the recess 35.

It is thus seen that the pivot pin-element 24 serves to pivotally connect the upper and lower bearing members 12 and 13, and this pivotal connection comes into play upon the excessive swaying movement of the upper bearing member, which ordinarily rolls or rocks upon the lower bearing member. The vertical displacement of the upper bearing member with respect to the lower bearing member is prevented by virtue of the interlocking flanges 27 and 36. The pin-elements 15 and 29 serve to securely attach the bearing members to the upper and lower bolsters, and to hold them against movement which would tend to shear the bolts which secure the bearing members to the bolster. It is thus seen that the pin-elements 15, 24, and 29 serve all the purposes of the usual continuous pin employed in truck center bearings, while dispensing with certain disadvantages encountered in connection with the continuous pin. In the use of the continuous pin, it is ordinarily necessary to provide an opening in the bottom of the car or vehicle, which is undesirable. Further, the pin frequently breaks, and in some types of center bearings, will drop out. By my construction, the pivot pin-element 24 may be made larger in diameter, and hence the liability of breakage is reduced. It would be impractical to make a continuous pin in a corresponding large diameter.

The casing or housing 18 is adapted to receive a lubricant, such as oil or grease, and also waste. The contacting faces 20 and 32 incline downwardly, in an outward direction, and should grit or other hard particles pass between these faces, the same will work out and pass into the groove 21. It is possible to retain the contacting faces 20 and 32 properly lubricated through long periods, which cannot be done with the ordinary type of center bearing. It has been proposed to employ bearing balls or bearing rolls in a center bearing, but these have not proven satisfactory, as in actual use, they invariably flatten or become deformed, which results in the quick destruction or injury to the bearings. The flattening of the bearing balls or bearing rolls, is due to the heavy load and to the swaying action.

When the device has been in use for a considerable length of time, the contact faces of the bearing elements may wear, and I contemplate employing a wear compensating washer 40, which will be placed about the pivot pin-element 24, between the contacting faces. If desired, a wear compensating washer or washers 40 may be employed permanently upon the bearing, but this is ordinarily not necessary, as the portions of the bearing members 12 and 13, adjacent to the contact faces 20 and 32 are suitably tempered to provide hard wear surfaces.

It is to be understood that the forms of my invention herewith shown and described are to be taken as preferred examples of the same, and that various changes in the shape, size, and arrangement of parts may be resorted to without departing from the spirit of my invention or the scope of the subjoined claim.

Having thus described my invention, I claim:

In a truck center bearing, a lower substantially flat base provided substantially centrally thereof with a bearing element projecting above the base and having a convex spherically curved contact face, said bearing element being provided with an imperforate pivot pin projecting above the same and formed integral therewith, said base having an upstanding flange projecting above the same and surrounding the bearing element, said flange being provided near its top with inwardly projecting locking flanges, said base being provided near its center with an imperforate pin element formed integral therewith and projecting below the same, an upper substantially flat plate having a depending bearing element to enter said flange and provided with a concave spherically contact face to engage the convex contact face and also having a recess to receive the pivot element, the last named bearing element being provided near its bottom with outwardly projecting locking flanges to engage beneath the first named locking flanges, the upstanding flange of base being also adapted for holding waste or other lubricating material, the upper plate having an imperforate pin element arranged above the same at its center and formed integral therewith, the pivot element and pin elements being arranged in end-to-end relation and in vertical alinement.

In testimony whereof I affix my signature.

THOMAS W. HAWLEY.